United States Patent
Lee et al.

(10) Patent No.: US 9,765,981 B2
(45) Date of Patent: Sep. 19, 2017

(54) HUMIDIFICATION FILTER, AND VAPORIZING HUMIDIFIER INCLUDING THE SAME

(71) Applicant: SAMSUNG ELECTRONICS CO., LTD., Suwon-si (KR)

(72) Inventors: Sang-hoon Lee, Yeoju (KR); Jeong-myeong Kim, Seoul (KR); Han-wook Cho, Yongin (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 59 days.

(21) Appl. No.: 14/876,292

(22) Filed: Oct. 6, 2015

(65) Prior Publication Data
US 2016/0123612 A1    May 5, 2016

(30) Foreign Application Priority Data
Oct. 30, 2014    (KR) .......................... 10-2014-0148915

(51) Int. Cl.
*F24F 6/06*    (2006.01)
*B01D 39/16*    (2006.01)
*B01D 39/08*    (2006.01)

(52) U.S. Cl.
CPC .............. *F24F 6/06* (2013.01); *B01D 39/083* (2013.01); *B01D 39/1615* (2013.01); *B01D 39/1623* (2013.01); *B01D 2239/064* (2013.01); *F24F 2006/065* (2013.01)

(58) Field of Classification Search
CPC .... F24F 6/06; B01D 39/1615; B01D 39/1623
USPC .......................................................... 261/107
See application file for complete search history.

(56) References Cited

U.S. PATENT DOCUMENTS 7,754,157 B2 *    7/2010    Tomioka ................... A61L 9/22
                                                              210/295

FOREIGN PATENT DOCUMENTS

| JP | 2010-164201 | 7/2010 |
| JP | 2010-169394 | 8/2010 |
| JP | 5503683 | 3/2014 |

* cited by examiner

*Primary Examiner* — Robert A Hopkins
(74) *Attorney, Agent, or Firm* — Staas & Halsey LLP

(57) ABSTRACT

A humidification filter, in one aspect, includes at least one of natural fiber and regenerated fiber mixed with a hydrophobic synthetic fiber.

21 Claims, 3 Drawing Sheets

HUMIDIFICATION FILTER, AND VAPORIZING HUMIDIFIER INCLUDING THE SAME

Figure 1:
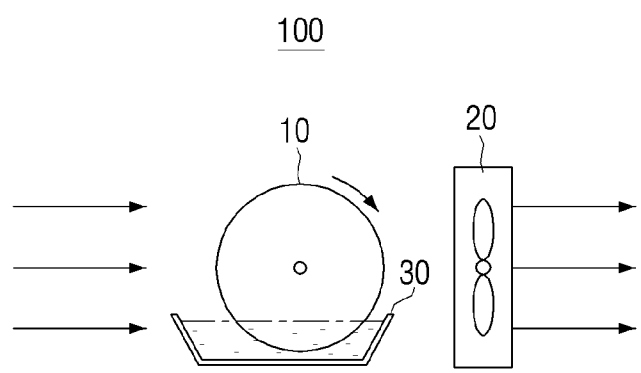

This application claims priority from Korean Patent Application No. 10-2014-0148915, filed on Oct. 30, 2014, in the Korean Intellectual Property Office, the disclosure of which is incorporated herein by reference in its entirety.

BACKGROUND

Field

Apparatuses and methods consistent with the present disclosure relate to a humidification filter, and a vaporizing humidifier including the same, and more particularly, to a humidification filter in which chemical substances having a pungent odor are not released when water is vaporized from the humidification filter, and a vaporizing humidifier including the same.

Description of Related Art

A humidifier may be classified into an ultrasonic humidifier and a vaporizing humidifier. The ultrasonic humidifier is a device in which an ultrasonic vibrator is used to produce fine water droplets, and the fine water droplets are supplied in the air to induce humidification. In addition, the vaporizing humidifier is a device in which water is evaporated by passing air through a wet filter to thereby induce humidification.

Unlike the ultrasonic humidifier, the vaporizing humidifier induces humidification by using a humidification filter, such that major characteristics such as a humidification amount may vary depending on a quality of material, a form, a material of the humidification filter, whether or not a chemical treatment is performed, and the like.

The humidification filter used in existing vaporizing humidifiers generally consists of a hydrophilic synthetic fiber or a hydrophobic synthetic fiber.

However, in the case of the humidification filter consisting of the hydrophilic synthetic fiber such as nylon, when humidification is performed in a state in which the humidification filter is sufficiently wet with water, the filter is operated normally; however, when the humidification filter is dried as water in a tank of a humidifier becomes insufficient, hydrophilic chemical substances are combined with water and released in the air, which causes a strong pungent odor.

Meanwhile, the humidification filter made of the hydrophobic synthetic fiber has minimal hydrophilic substances, such that there is little possibility that the above-described problems are incurred; however, it still has a problem in that a humidification amount to be provided is not sufficient. Accordingly, in order to obtain a desired humidification amount in the humidification filter consisting of the hydrophobic synthetic fiber, it is necessary to perform a chemical treatment such as hydrophilic coating. Even in this case, there is problem in that when the humidification filter is dried, the coated chemical substances are evaporated with the water, which causes a strong pungent odor.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides a humidification filter in which chemical substances having a pungent odor are not released when water is vaporized from the humidification filter, and a vaporizing humidifier including the same.

According to an aspect of the present disclosure, there is provided a humidification filter in which at least one of natural fibers and regenerated fibers is mixed with a hydrophobic synthetic fiber.

Hydrophilic coating treatment may be performed on the hydrophobic synthetic fiber.

The natural fiber may be one of a hemp fiber, a cotton fiber, and a bamboo fiber.

The regenerated fiber may be viscose rayon.

The hydrophobic synthetic fiber may be any one of polypropylene (PP) and polyethylene terephthalate (PET).

The humidification filter may have a woven form in which at least one of the natural fibers and the regenerated fibers is woven with the hydrophobic synthetic fiber.

The humidification filter may have a non-woven form in which at least one of the natural fibers and the regenerated fibers is mixed with the hydrophobic synthetic fiber.

The humidification filter having the non-woven form may have a density of 80 to 110 $g/m^2$.

The humidification filter may have a plurality of folds.

The natural fibers or the regenerated fibers may consist of a single strand.

The hydrophobic synthetic fiber in the humidification filter may have a rate of 70 to 90%.

The natural fibers or the regenerated fibers may be made by twisting a plurality of strands.

The hydrophobic synthetic fiber in the humidification filter may have a rate of 50 to 90%.

According to another aspect of the present disclosure, a vaporizing humidifier includes: a humidification filter in which at least one of natural fibers and regenerated fibers is mixed with a hydrophobic synthetic fiber.

Additional and/or other aspects and advantages of the disclosure will be set forth in part in the description which follows and, in part, will be obvious from the description, or may be learned by practice of the disclosure.

BRIEF DESCRIPTION OF THE DRAWING FIGURES

Figure 2:
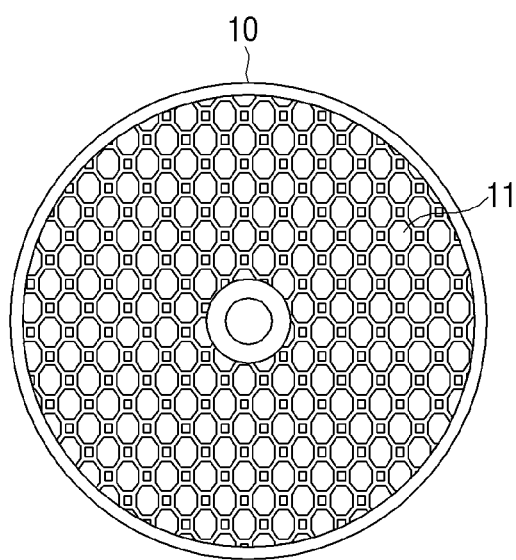
Figure 3:
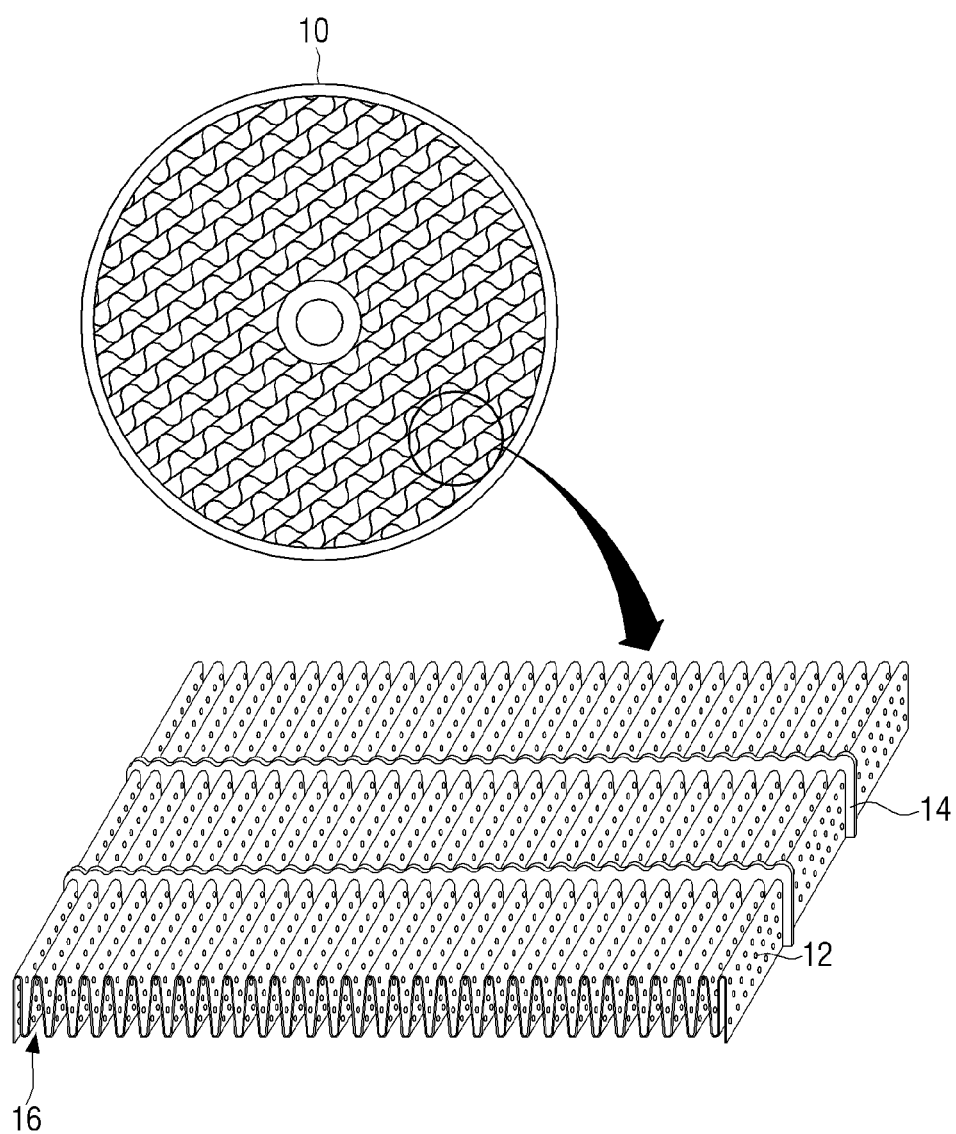

The above and/or other aspects of the present disclosure will be more apparent by describing certain exemplary embodiments of the present disclosure with reference to the accompanying drawings, in which:

FIG. 1 is a view illustrating a humidifier according to an exemplary embodiment of the present disclosure; and FIGS. 2 and 3 are views illustrating humidification filters according to various exemplary embodiments of the present disclosure.

DESCRIPTION OF EXEMPLARY EMBODIMENTS

Hereinafter, exemplary embodiments of the present disclosure will be described in detail with reference to the accompanying drawings. Meanwhile, when it is determined that the detailed description of the known functions or configurations related with the present disclosure may obscure the gist of the present disclosure, the detailed description thereof will be omitted.

The exemplary embodiments may vary and may be provided in different exemplary embodiments. Specific exemplary embodiments will be described with reference to accompanying drawings and detailed explanation. However, this does not necessarily limit the scope of the exemplary embodiments to a specific embodiment form. Instead, modifications, equivalents and replacements included in the disclosed concept and technical scope of this specification may be employed.

Throughout the present specification including the drawings, when it is described that an element is "connected" to another element, the element may be "directly connected" to another element, or "indirectly connected" to another element having a third element interposed therebetween. A term in a singular form includes a plural form unless it is intentionally written that way. The terms, such as 'include,' 'comprise,' 'configured to,' in the description are used to indicate that there are features, numbers, steps, operations, elements, parts or combination thereof, and they should not exclude the possibilities of combination or addition of one or more features, numbers, steps, operations, elements, parts or combination thereof. The phrase "at least one of," when followed by a list of two or more items, is an alternative expression denoting a selection of one or more items from the list.

FIG. 1 is a view illustrating a humidifier 100 according to an exemplary embodiment of the present disclosure.

Referring to FIG. 1, the humidifier 100 according to an exemplary embodiment of the present disclosure is a vaporizing humidifier in which water is evaporated by passing air through a wet filter to thereby induce humidification. The present humidifier 100 includes a humidification filter 10, an air blowing fan 20, and a water tank 30.

A humidification filter 10 may be provided in the humidifier 100 as shown in FIG. 1, and water of the water tank 30 may be equally absorbed in the humidification filter 10 as the humidification filter 10 is rotated. Meanwhile, the humidification filter 10 may be manufactured in various shapes such as a disk, a paper, and the like.

Although not shown in FIG. 1, a supporting member that supports the humidification filter 10 for rotating the humidification filter 10 may be provided, and the humidification filter 10 can be mounted to the supporting member or detached from the supporting member. As the supporting member is rotated, the humidification filter 10 mounted to the supporting member may be rotated.

As the humidification filter 10 is rotated as described above, water in the water tank 30 may be absorbed in the humidification filter 10. In addition, water absorbed in the humidification filter 10 may be vaporized by external air provided by the air blowing fan 20. That is, the humidification filter 10 serves to expand a contact area of water and external air so as to easily generate vaporization of water.

Meanwhile, the humidification filter 10 according to an exemplary embodiment of the present disclosure is manufactured by mixing at least one of natural fibers and regenerated fibers with a hydrophobic synthetic fiber, and may be manufactured in various forms.

As one example, the humidification filter 10 according to an exemplary embodiment of the present disclosure has a fabric form in which at least one of the natural fibers and the regenerated fibers is woven with the hydrophobic synthetic fiber. One example of the woven humidification filter 10 is shown in FIG. 2.

FIG. 2 is a view illustrating the woven humidification filter 10 according to an exemplary embodiment of the present disclosure. Referring to FIG. 2, the humidification filter 10 may have a woven form in which at least one of the natural fibers and the regenerated fibers is woven with the hydrophobic synthetic fiber so as to have a surface area sufficient for absorption and vaporization of water, such that the humidification filter 10 may have a plurality of pores 11. Specifically, the woven form may be a three-dimensional fabric form which is favorable to expand the surface area, that is, a mesh form. An example of the fabric form which is applicable to the present humidification filter 10 may include a Russell structure, or a hive structure.

The humidification filter 10 according to another exemplary embodiment of the present disclosure may have a non-woven form in which at least one of the natural fibers and the regenerated fibers is mixed with the hydrophobic synthetic fiber. Unlike the woven form, the non-woven form means a form in which fibers are suitably arranged, and then, by adhesive, or close adhesion or entanglement of the fibers themselves, the fibers are mixed with each other.

The humidification filter 10 may be manufactured in various shapes in addition to the above-described shapes. Hereinafter, a fiber material used in the humidification filter 10 is specifically described.

The humidification filter 10 according to an exemplary embodiment of the present disclosure is manufactured by mixing different kinds of fibers, specifically, by mixing the natural fibers or the regenerated fibers with the synthetic fiber.

The synthetic fiber used in the humidification filter 10 may be, for example, a hydrophobic synthetic fiber such as polypropylene (PP), polyethylene terephthalate (PET), or the like.

Meanwhile, when a chemical treatment such as hydrophilic coating, or the like, is performed on the hydrophobic synthetic fiber, it is favorable to sufficiently wet the humidification filter 10 with water; however, when the humidification filter 10 is dried, pungent odor caused by the chemical treatments may occur. Accordingly, the chemical treatment such as hydrophilic coating, or the like may be not performed on the hydrophobic synthetic fiber used in the humidification filter 10, according to an exemplary embodiment of the present disclosure.

In addition, the synthetic fiber used in the humidification filter 10 may be a hydrophilic synthetic fiber such as nylon. Meanwhile, when the hydrophilic synthetic fiber such as nylon is dried, hydrophilic chemical substances included in the fiber itself may be vaporized, which causes a pungent odor.

Accordingly, in order to prevent occurrence of pungent odor, the synthetic fiber used in the humidification filter 10 is preferably hydrophobic. In this case, it is difficult to achieve sufficient moisture absorption amount only with the hydrophobic synthetic fiber. Accordingly, in order to overcome the disadvantage of the synthetic fiber, natural fibers or regenerated fibers having excellent moisture absorption and desorption characteristics without releasing pungent odor may be more mixed to manufacture the humidification filter 10.

In this case, for example, the natural fiber may be one of a hemp fiber, a cotton fiber, and a bamboo fiber. In addition, the regenerated fiber may have a cellulose molecular structure, and as one example, may be viscose rayon.

Meanwhile, as compared to the synthetic fiber, the natural fiber or the regenerated fiber generally exhibits a weak strength and has a large range of deformation due to moisture absorption or desorption. Accordingly, when the humidification filter 10 consists of only the natural fibers or the regenerated fibers, it is difficult to obtain the humidification filter 10 having desirable durability. In addition, since it is easy to deform the natural fibers or the regenerated fibers, the humidification filter 10 may be separated from a member supporting the humidification filter 10, such that water splatters on an undesired spot in the humidifier 100, which causes malfunction of the humidifier 100. Further, in this case, water may be released to an external portion of the humidifier 100, which may provide inconvenience to users. Therefore, according to exemplary embodiments of the present disclosure, the synthetic fiber having high strength and being favorable to stabilize a form may be mixed with the natural fibers or the regenerated fibers, such that disadvantages of the natural fibers or the regenerated fibers may be offset by the synthetic fiber. That is, the humidification filter 10 according to exemplary embodiments of the present disclosure is capable of maximally utilizing advantages of each fiber.

Meanwhile, the natural fibers or the regenerated fibers are a cotton yarn, and accordingly, may have weak tensile strength as compared to the synthetic fiber which is a filament yarn, such that at the time of mixing the natural fibers or the regenerated fibers with the synthetic fiber having the same thickness, the natural fibers or the regenerated fibers may be broken due to different strength between the natural fibers or the regenerated fibers and the synthetic fiber. Accordingly, the natural fibers or the regenerated fibers used in the humidification filter 10 according to an exemplary embodiment of the present disclosure may be made by twisting a plurality of strands so as to have appropriate strength. That is, the natural fibers or the regenerated fibers may be made by twisting two or more strands of natural fiber yarn or regenerated fiber yarn. At the time of using the natural fibers or the regenerated fibers made by twisting a plurality of strands as described above, a shrinkage rate according to characteristics of the natural fibers or the regenerated fibers themselves may be minimized at the time of being woven.

Hereinafter, mixing rates of the fibers configuring the humidification filters 10 according to various exemplary embodiments of the present disclosure are described.

Performances of the humidification filters 10 manufactured according to various exemplary embodiments of the present disclosure were tested, and results thereof were shown in Tables 1 and 2.

Specifically, Table 1 shows shrinkage rates of the humidification filters each obtained by weaving a single strand of the natural fiber or the regenerated fiber, and Table 2 shows shrinkage rates of the humidification filters each obtained by weaving the natural fiber or the regenerated fiber made by twisting two or more strands.

TABLE 1

Shrinkage rates of humidification filters each having a three-dimensional woven structure (Russell structure), according to different mixing rates corresponding to different ratios of [Synthetic fiber: single strand of natural fiber (regenerative fiber)]

| Mixing rate of synthetic fiber | Shrinkage rate | Determination |
| --- | --- | --- |
| 95% | 2% | Shrinkage was stable/humidification amount was insufficient |
| 90% | 3% | Shrinkage was stable. |
| 80% | 5% | Shrinkage was stable. |
| 70% | 7% | Shrinkage was stable. |
| 60% | 10% | Shrinkage amount was large. |
| 50% | 16% | Shrinkage amount was large. |
| 20% | 22% | Shrinkage amount was large. |
| 0% | 25% | Shrinkage amount was large. |

Section showing stable shrinkage: less than 10% of shrinkage rate
Used synthetic fiber: PET
Used natural fiber: hemp fiber
Used regenerated fiber: viscose rayon.

Table 1 shows experimental results of each of [PET: single strand of a hemp fiber] and [PET: single strand of viscose rayon]. As experimental results, the humidification filter having a rate of PET, hydrophobic synthetic fiber, of 70 to 90%, achieved a shrinkage rate of less than 10%.

TABLE 2

Shrinkage rates of humidification filters each having a three-dimensional woven structure (Russell structure), according to different mixing rates corresponding to different ratios of [Synthetic fiber: natural fiber (regenerative fiber) made by twisting a plurality of strands]

| Mixing rate of synthetic fiber | Shrinkage rate | Determination |
| --- | --- | --- |
| 95% | 1% | Shrinkage was stable/humidification amount was insufficient |
| 90% | 2% | Shrinkage was stable |
| 80% | 3% | Shrinkage was stable |
| 70% | 4% | Shrinkage was stable |
| 60% | 7% | Shrinkage was stable |
| 50% | 9% | Shrinkage was stable |
| 20% | 22% | Shrinkage amount was large. |
| 0% | 25% | Shrinkage amount was large. |

Section showing stable shrinkage: less than 10% of shrinkage rate
Used synthetic fiber: PET
Used natural fiber: hemp fiber
Used regenerated fiber: viscose rayon Table 2 shows experimental results of each of [PET: a hemp fiber made by twisting a plurality of strands] and [PET: viscose rayon made by twisting a plurality of strands]. As experimental results, the humidification filter having a rate of PET, hydrophobic synthetic fiber, of 50 to 90%, achieved a shrinkage rate of less than 10%.

According to the above-described experimental results, it could be appreciated that the humidification filter 10 in which the natural fiber or the regenerated fiber made by twisting a plurality of strands was woven with the synthetic fiber obtained desirable shrinkage at a section in which a rate of the synthetic fiber is 50 to 90%, and the humidification filter 10 in which the natural fiber or the regenerated fiber made by a single strand was woven with the synthetic fiber obtained desirable shrinkage at a section in which a rate of the synthetic fiber is 70 to 90%. That is, it could be appreciated that at the time of using the natural fiber or the regenerated fiber made by twisting a plurality of strands, even though the synthetic fiber was included at a relatively low ratio, the shape of the humidification filter 10 was stably maintained.

According to various exemplary embodiments of the present disclosure, the humidification filter 10 is possible to be manufactured in various shapes. The humidification filter 10 used in the above-described experiment had a Russell structure, and did not have folds. However, a humidification filter 10 according to another exemplary embodiment of the present disclosure may have a plurality of folds to expand surface area. At the time of using the humidification filter 10 having a large surface area, a larger amount of humidification may be obtained.

FIG. 3 is a view illustrating the humidification filter 10 having a plurality of folds according to an exemplary embodiment of the present disclosure.

Referring to FIG. 3, the humidification filter 10 according to the present exemplary embodiment has a plurality of folds 16. In addition, a plurality of punch holes 12 may be formed on surfaces partitioned by the plurality of folds 16. The fold means wrinkles as shown in FIG. 3.

Meanwhile, a shape retaining member 14 may be inserted and fixed among the plurality of folds 16 so as to retain intervals of wrinkles of the humidification filter 10 having the plurality of folds 16. For example, the shape retaining member 14 may be a silicone cured after being melted at a high temperature and being charged among the folds 16.

The above-described bend-type humidification filter 10 may have a woven form in which the fibers are woven, or a non-woven form in which the fibers are appropriately arranged and fixed with an adhesive, and the like.

When the humidification filter 10 is a bend-type having the shape retaining member 14 as shown in FIG. 3, since shape stability may be maintained by the shape retaining member 14, an effect on shrinkage rate according to a mixing rate of the natural fibers or the regenerated fibers and the synthetic fibers is small. Accordingly, the mixing rate may be appropriately selected in consideration of at least one characteristic of fiber cost and moisture-absorption and -desorption of the fiber.

In order for the humidification filter 10 to have a fold form as shown in FIG. 3, a fold operation needs to be performed, and in order to charge the shape retaining member 14 among the folds, a hot melting operation is performed. In this case, when the humidification filter 10 has a non-woven form, it is required to carefully select density of the non-woven so as to smoothly perform the fold operation and the hot melting operation. Experimental results regarding the density of the non-woven are described below.

In this experiment, the rate of the synthetic fiber occupied in the entire humidification filter 10 was 70 to 90%. That is, the rate of the relatively high-priced natural fiber or regenerated fiber was 10 to 30% in consideration of cost. The natural fiber (regenerated fiber) and the synthetic fiber were mixed at the above-described rate to thereby manufacture humidification filters 10 having folds and different densities of non-woven forms. Specifically, the synthetic fiber used in this experiment was PET.

As experimental results, it could be appreciated that when the density of the non-woven was less than 80 g/m$^2$, it was easy to deform the non-woven due to a weak strength, and at the time of manufacturing the non-woven, since it was difficult to control intervals of the folds, the intervals were required to be minimized, and accordingly, water supply to the humidification filter 10 was not smoothly performed, such that humidification amount was not uniform.

Meanwhile, it could be appreciated that when the density of the non-woven was more than 110 g/m$^2$, an amount of water at the time of absorbing water in the humidification filter 10 was excessively large, such that weight of the humidification filter 10 was increased. In addition, since the amount of water absorbed in the humidification filter 10 was large, the humidification filter 10 was not rapidly dried up during drying or when the humidifier 100 was not operated, such that it was left in a wet state for a long time, which caused problems such as microbial growth or odor occurrence.

Accordingly, the humidification filter 10 having the non-woven form made by mixing the natural fiber or the regenerated fiber with the synthetic fiber preferably had a density of 80 to 110 g/m$^2$.

The humidification filters 10 according to various exemplary embodiments as described above consist of the hydrophobic synthetic fiber and the natural fiber or the regenerated fiber unlike the existing art, such that at the time of drying the filters, pungent odor rarely occurs. In order to confirm the occurrence degree of pungent odor at the time of using the humidification filters 10 according to various exemplary embodiments of the present disclosure, the following experiments were performed.

Specifically, Table 3 shows summary of odorants and concentration thereof in the humidification filter manufactured only by the synthetic fibers according to the existing technology for comparison, and Table 4 shows summary of odorants and concentration thereof in the humidification filters manufactured according to various exemplary embodiments of the present disclosure.

TABLE 3

Odorants of humidification filters according to Comparative Examples of the present disclosure and concentration of odorants

| Classification | | PET (Treated by hydrophilic coating) | PP (Treated by hydrophilic coating) | PET | PP | Nylon | Ref. (In the air) |
|---|---|---|---|---|---|---|---|
| Concentration of main substances causing odor when odor occurs. (unit: ppb) | Pentanal | 37.6 | 36.1 | 1 | 0 | 15 | 0 |
| | Butanal | 35.1 | 30.5 | 0 | 0 | 22 | 1.3 |
| | Acetic acid | 188.4 | 164.4 | 0 | 1 | 108 | 0 |
| | 3-(Methylthio)-1-propene | 30 | 28 | 0 | 0 | 11 | 0 |
| | Acetaldehyde | 23.6 | 33.1 | 2.0 | 1.8 | 28 | 2.1 |

As shown in Table 3, it could be appreciated that a large amount of substances causing pungent odor occurred in the case of the humidification filter consisting of the hydrophilic synthetic fiber such as nylon; however, the substances causing pungent odor rarely occurred in the case of the humidification filter consisting of the hydrophobic synthetic fiber such as PP or PET. However, the hydrophobic synthetic fiber such as PP or PET has a small moisture absorption amount of water, such that hydrophilic coating treatment is necessarily performed on the hydrophobic synthetic fiber, and after the hydrophilic coating treatment, a large amount of substances causing a pungent odor occurred as shown in Table 3.

TABLE 4

Odorants of humidification filters according to various exemplary embodiments of the present disclosure and concentration of odorants

| Classification | | hemp-PET | bamboo-PP | viscose rayon-PET | cotton-PET | Ref (in the air) |
|---|---|---|---|---|---|---|
| Concentration of main substances causing odor when odor occurs. (unit: ppb) | Pentanal | 3.9 | 1.2 | 0 | 1.2 | 0 |
| | Butanal | 2.2 | 0 | 0 | 2.0 | 1.3 |
| | Acetic acid | 0 | 0 | 0 | 0 | 0 |
| | 3-(Methylthio)-1-propene | 0 | 0 | 0 | 0 | 0 |
| | Acetaldehyde | 1.3 | 1.2 | 2.8 | 1.1 | 2.1 |

The rate of the natural fiber or the regenerated fiber used in each experiment of Table 4 was 20%.

As shown in Table 4, it could be appreciated that the substances causing a pungent odor rarely occurred during drying in the case of the humidification filters manufactured by mixing the natural fibers or the regenerated fibers with the synthetic fibers according to various exemplary embodiments of the present disclosure. In addition, the disadvantage of the hydrophobic synthetic fiber in which a moisture absorption capacity is deteriorated is capable of being complemented by the natural fiber or the regenerated fiber having excellent moisture absorption and moisture desorption characteristics.

Hereinabove, the humidification filters 10 according to various exemplary embodiments of the present disclosure have been described. Hereinafter, other configurations of the humidifier 100 shown in FIG. 1 is described.

The air blowing fan 20 forms an air flow according to a driving speed of a motor (not-shown) to supply external air to the humidification filter 10. A vaporization amount in the humidification filter 10 may be controlled according to air volume provided by the air blowing fan 20, and generally, as the air volume is increased, the vaporization amount is also increased.

The air volume provided by the air blowing fan 20 may indicate a volume per unit of time of external air supplied to the humidification filter 10 by the air blowing fan 20, and the air volume may vary depending on the driving speed of the motor. That is, as the driving speed of the motor becomes fast, the air volume provided by the air blowing fan 20 may be increased, and as the driving speed of the motor becomes slow, the air volume may be decreased. The air volume of the air blowing fan 20 may be controlled by controlling the driving speed of the motor in a controller (not-shown) of the humidifier 100.

The water tank 30 is to supply water to the humidification filter 10. Specifically, water of the water tank 30 may be absorbed in the humidification filter 10, and then, may be supplied to external air by an evaporation phenomenon generated in the humidification filter 10. Vaporization of water generated in the humidification filter 10 may be determined according to the air volume of the air blowing fan 20 and humidity of the external air as described above. As the air volume of the air blowing fan 20 is increased, and the humidity of the external air is decreased, vaporization of water in the humidification filter 10 may be actively generated.

The humidifiers 100 according to various exemplary embodiments of the present disclosure as described above use the humidification filter 10 in which the natural fiber or the regenerated fiber is mixed with the synthetic fiber, such that both of shape stability and shrinkage stability which are advantages of the synthetic fiber may be implemented together with excellent moisture absorption and moisture desorption characteristics without releasing a pungent odor at the time of drying the humidification filter which are advantages of the natural fiber or the regenerated fiber. Accordingly, the humidifier 100 according to the present disclosure is possible to secure an appropriate humidification amount, and does not release a pungent odor during an operation, and does not have problems (for example, water drops) caused by deformation of the humidification filter.

Meanwhile, the humidifier 100 as described above may be implemented as an air cleaner having a humidification function. When the humidifier 100 is implemented as an air cleaner, the humidifier 100 may further include a filter part (not-shown) for removing pollutants in the air introduced by the air blowing fan 20. In addition, by passing the introduced air through a plurality of filters configuring the filter part, the pollutants such as dust, and the like, present in the air may be adsorbed onto a filter part. Further, the filter part may perform functions such as deodorization, sterilization, and the like, in addition to dust removal.

According to various aspects of the present disclosure as described above, a problem of a pungent odor when the humidification filter is dried is capable of being solved.

Although preferred embodiments of the present disclosure have been illustrated and described, the present disclosure is not limited to the above-mentioned embodiments and various modifications can be made by those skilled in the art without departing from the scope of the appended claims of the present disclosure. In addition, these modified embodiments should not be appreciated separately from technical spirits or prospects of the present disclosure.

What is claimed is:

1. An apparatus comprising:
    a hydrophobic synthetic fiber; and
    at least one of a natural fiber and a regenerated fiber mixed with the hydrophobic synthetic fiber,
    wherein the apparatus is a humidification filter.

2. The apparatus as claimed in claim 1, wherein the hydrophobic synthetic fiber is unprocessed by hydrophilic coating treatment on the hydrophobic synthetic fiber.

3. The apparatus as claimed in claim 1, wherein the at least one of the natural fiber and the regenerated fiber is at least a natural fiber that is one of a hemp fiber, a cotton fiber, and a bamboo fiber.

4. The apparatus as claimed in claim 1, wherein the at least one of the natural fiber and the regenerated fiber is at least a regenerated fiber that is viscose rayon.

5. The apparatus as claimed in claim 1, wherein the hydrophobic synthetic fiber is any one of polypropylene (PP) and polyethylene terephthalate (PET).

6. The apparatus as claimed in claim 1, wherein the apparatus is a humidification filter having a woven form in which the at least one of the natural fiber and the regenerated fiber is woven with the hydrophobic synthetic fiber.

7. The apparatus as claimed in claim 6, wherein the woven form of the apparatus is a porous mesh.

8. The apparatus as claimed in claim 1, wherein the apparatus is a humidification filter having a non-woven form in which the at least one of the natural fiber and the regenerated fiber is mixed with the hydrophobic synthetic fiber by adhesion or entanglement.

9. The apparatus as claimed in claim 8, wherein the apparatus is a humidification filter having the non-woven form with a density of 80 to 110 g/m$^2$.

10. The apparatus as claimed in claim 1, wherein the apparatus is a humidification filter having a plurality of folds.

11. The apparatus as claimed in claim 1, wherein the natural fiber or the regenerated fiber consist of a single strand.

12. The apparatus as claimed in claim 11, wherein the hydrophobic synthetic fiber is included in the apparatus in a mixing rate of 70 to 90%.

13. The apparatus as claimed in claim 1, wherein the natural fiber or the regenerated fiber are made by twisting a plurality of strands.

14. The apparatus as claimed in claim 13, wherein the hydrophobic synthetic fiber is included in the apparatus in a mixing rate of 50 to 90%.

15. A humidification filter comprising:
a natural or regenerated fiber to absorb water provided to the humidification filter and desorb the water by evaporation; and
a synthetic fiber having a strength greater than that of the natural or regenerated fiber, mixed with the natural or regenerated fiber to provide strength to the humidification filter, and being substantially free of vaporizable hydrophilic chemical substances.

16. The humidification filter according to claim 15, wherein the natural or regenerated fiber is any one of a hemp fiber, a cotton fiber, a bamboo fiber, and a regenerated fiber having a cellulose molecular structure.

17. The humidification filter according to claim 15, wherein the synthetic fiber has a mixing rate of 50 to 90% in the humidification filter.

18. A vaporizing humidifier comprising:
the humidification filter according to claim 15; and
a water tank to supply the water to the natural or regenerated fiber.

19. The vaporizing humidifier of claim 18, further comprising an air blowing fan to cause the natural or regenerated fiber to desorb the water by evaporation.

20. A vaporizing humidifier comprising:
a humidification filter including a hydrophobic synthetic fiber and at least one of a natural fiber and a regenerated fiber mixed with the hydrophobic synthetic fiber.

21. The apparatus as claimed in claim 1, wherein the hydrophobic synthetic fiber is substantially free of vaporizable hydrophilic chemical substances.

* * * * *